(12) United States Patent
Gross

(10) Patent No.: US 11,437,014 B1
(45) Date of Patent: Sep. 6, 2022

(54) WAVEGUIDE FOR ULTRASONIC AND LIGHT-BASED RANGE AND PROXIMITY SENSING

(71) Applicant: MaxBotix Inc, Brainerd, MN (US)

(72) Inventor: Robert R. Gross, Nisswa, MN (US)

(73) Assignee: MAXBOTIX INC., Brainerd, MN (US)

( * ) Notice: Subject to any disclaimer, the term of this patent is extended or adjusted under 35 U.S.C. 154(b) by 516 days.

(21) Appl. No.: 16/717,800

(22) Filed: Dec. 17, 2019

(51) Int. Cl.
*G10K 11/32* (2006.01)
*G01S 15/08* (2006.01)
*G10K 11/22* (2006.01)

(52) U.S. Cl.
CPC .............. *G10K 11/32* (2013.01); *G01S 15/08* (2013.01); *G10K 11/22* (2013.01)

(58) Field of Classification Search
CPC ........ G10K 11/32; G10K 11/22; G01S 15/08; H01P 3/12; H01P 3/123; H01P 3/127
See application file for complete search history.

(56) References Cited

U.S. PATENT DOCUMENTS

| | | | |
|---|---|---|---|
| 7,679,996 B2 | 3/2010 | Gross | 367/99 |
| 11,229,449 B2 * | 1/2022 | Tschudy | A61B 17/22004 |
| 2020/0179168 A1 * | 6/2020 | Kelleher | A61N 5/0624 |

* cited by examiner

*Primary Examiner* — Catherine T. Rastovski
(74) *Attorney, Agent, or Firm* — Hayes Soloway P.C.

(57) ABSTRACT

An ultrasonic and optical waveguide apparatus includes a face plate and an ultrasonic waveguide extending through a portion of the face plate. The ultrasonic waveguide has a hollow interior with an interior diameter tapered along an elongate axis of the ultrasonic waveguide. The elongate axis of the ultrasonic waveguide is oriented orthogonal to the face plate. An optical shield extends through at least a portion of the hollow interior of the ultrasonic waveguide. The optical shield prevents transmission of a portion of light through the hollow interior.

20 Claims, 7 Drawing Sheets

WAVEGUIDE FOR ULTRASONIC AND LIGHT-BASED RANGE AND PROXIMITY SENSING

FIELD OF THE DISCLOSURE

The present disclosure is generally related to detecting and/or estimating the range/proximity to objects and more particularly is related to an apparatus and method for sending a range and proximity of objects.

BACKGROUND OF THE DISCLOSURE

Currently, sensors exist for ultrasonic range/proximity sensing and near-infrared range/proximity sensing. These ranging sensors work successfully to various degrees, but often fail to provide range/proximity determinations with the heightened accuracy required by many modern applications. In particular, both ultrasonic sensors and near-infrared sensors have range limitations which affect the accuracy of the results depending on the distance of the sensed object. For example, ultrasonic sensors experience divergence after a certain distance, such that the sensor is unable to determine a range or proximity of the object successfully. Near-infrared sensors, including long infrared (IR) sensors and short range IR sensors can experience problems with reflectivity in certain environments, making them inaccurate and unreliable.

To overcome these limitations, detectors that utilize both ultrasonic and light-based sensors have been proposed. These detectors include, in part, at least one ultrasonic transducer located between an optical transmitter and an optical receiver. The ultrasonic transducer and optical transmitter/receiver pair may work alone or in conjunction with one another to estimate the range or proximity of an object. However, even this design is susceptible to limitations. For example, the ultrasonic waves transmitted by the ultrasonic transducer may not be optimally sized, shaped, or directed to the object to be detected and measured. In another example, the ultrasonic waves received by the ultrasonic transducer may be too weak to properly detect. In another example, the optical receiver may be susceptible to optical noise, including ambient noise and crosstalk from the optical transmitter. This noise may affect the accuracy of optical measurements made by the detector.

Thus, a heretofore unaddressed need exists in the industry to address the aforementioned limitations, deficiencies and inadequacies.

SUMMARY OF THE DISCLOSURE

Embodiments of the present disclosure provide a system and apparatus for an ultrasonic and optical waveguide. Briefly described, in architecture, one embodiment of the apparatus, among others, can be implemented as follows. An ultrasonic and optical waveguide apparatus includes a face plate and an ultrasonic waveguide extending through a portion of the face plate. The ultrasonic waveguide has a hollow interior with an interior diameter tapered along an elongate axis of the ultrasonic waveguide. The elongate axis of the ultrasonic waveguide is oriented orthogonal to the face plate. An optical shield extends through at least a portion of the hollow interior of the ultrasonic waveguide. The optical shield prevents transmission of a portion of light through the hollow interior.

In one embodiment of the apparatus, the optical shield has a thin, planar shape.

In another embodiment of the apparatus, a face of the optical shield is oriented at an angle preferably about a 45° angle relative to a front face of the apparatus.

In another embodiment of the apparatus, in operation, the optical shield is oriented between a connected light-based emitter and a connected light-based receiver.

In yet another embodiment of the apparatus, at least a portion of an outer edge of the optical shield extends to an outer edge of the ultrasonic waveguide.

In still yet another embodiment of the apparatus, a portion of the outer edge of the optical shield is located within the hollow interior of the ultrasonic waveguide. In a particular embodiment, the optical shield does not extend through a bottom portion of the hollow interior of the ultrasonic waveguide.

In another embodiment of the apparatus, an outer edge of the ultrasonic waveguide extends above the face plate.

In another embodiment of the apparatus, a base of the ultrasonic waveguide is substantially square.

In another embodiment of the apparatus, an outer edge of the ultrasonic waveguide is at least partially ellipsoidal.

The present disclosure can also be viewed as providing methods of sensing a range and proximity of an object. In this regard, one embodiment of such a method, among others, can be broadly summarized by the following steps: positioning, on a detector comprising an ultrasonic transducer, a light-based emitter, and a light-based receiver, an ultrasonic and optical waveguide apparatus, comprising: a face plate, an ultrasonic waveguide extending through a portion of the face plate, the ultrasonic waveguide having a hollow interior with an interior diameter tapered along an elongate axis of the ultrasonic waveguide, wherein the elongate axis of the ultrasonic waveguide is oriented orthogonal to the face plate, and an optical shield extending through at least a portion of the hollow interior of the ultrasonic waveguide, wherein the optical shield prevents transmission of a portion of light through the hollow interior, transmitting and receiving an ultrasonic signal with the ultrasonic transducer and along the ultrasonic waveguide; transmitting an optical signal with the light-based emitter and receiving a reflected optical signal with the light-based receiver, wherein crosstalk from the transmitted optical signal is prevented from reaching the light-based receiver by the optical shield; and sensing at least one of a range and a proximity of an object with at least one of the ultrasonic signal and the reflected optical signal.

In one embodiment of the method, the optical shield has a thin, planar shape.

In another embodiment of the method, a face of the optical shield is oriented at an angle preferably about a 45° angle relative to a front face of the method.

In another embodiment of the method, in operation, the optical shield is oriented between a connected light-based emitter and a connected light-based receiver.

In another embodiment of the method, at least a portion of an outer edge of the optical shield extends to an outer edge of the ultrasonic waveguide.

In yet another embodiment of the method, a portion of the outer edge of the optical shield is located within the hollow interior of the ultrasonic waveguide. In a particular embodiment, the optical shield does not extend through a bottom portion of the hollow interior of the ultrasonic waveguide.

In still yet another embodiment of the method, an outer edge of the ultrasonic waveguide extends above the face plate.

In another embodiment of the method, a base of the ultrasonic waveguide is substantially square.

In another embodiment of the method, an outer edge of the ultrasonic waveguide is at least partially ellipsoidal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
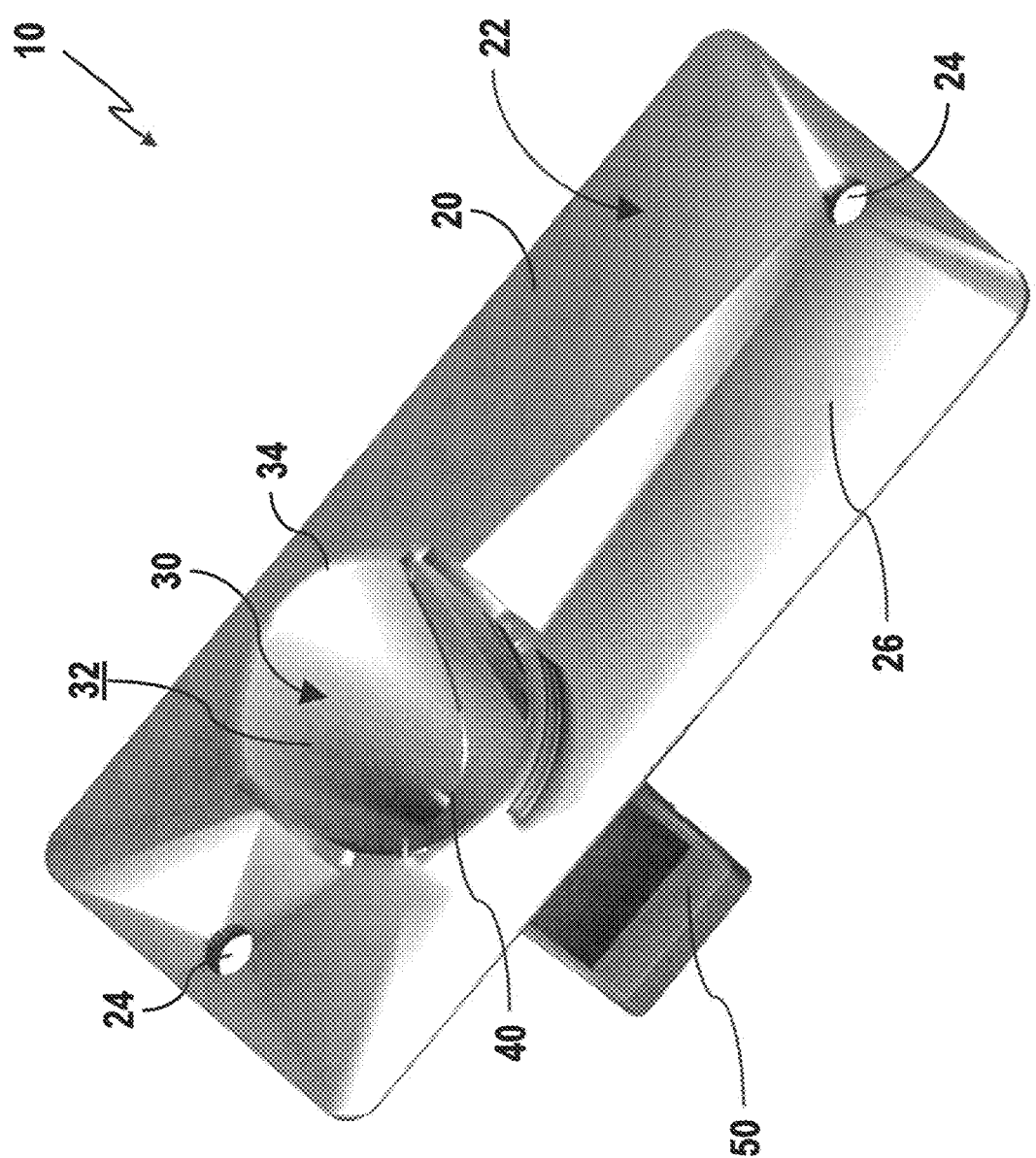
FIG. 1 is an isometric illustration of an ultrasonic and optical waveguide apparatus, in accordance with a first exemplary embodiment of the present disclosure.

FIG. 1 is an isometric illustration of an ultrasonic and optical waveguide apparatus ("waveguide apparatus") 10, in accordance with a first exemplary embodiment of the present disclosure. The waveguide apparatus 10 includes a face plate 20 and an ultrasonic waveguide 30 extending through a portion of the face plate 20. The ultrasonic waveguide 30 has a hollow interior 32 with an interior diameter tapered along an elongate axis 34, shown in FIG. 3, of the ultrasonic waveguide 30. The elongate axis 34 of the ultrasonic waveguide 30 is oriented orthogonal to the face plate 20. An optical shield 40 extends through at least a portion of the hollow interior 32 of the ultrasonic waveguide 30. The optical shield 40 prevents transmission of a portion of light through the hollow interior 32.

Figure 5:
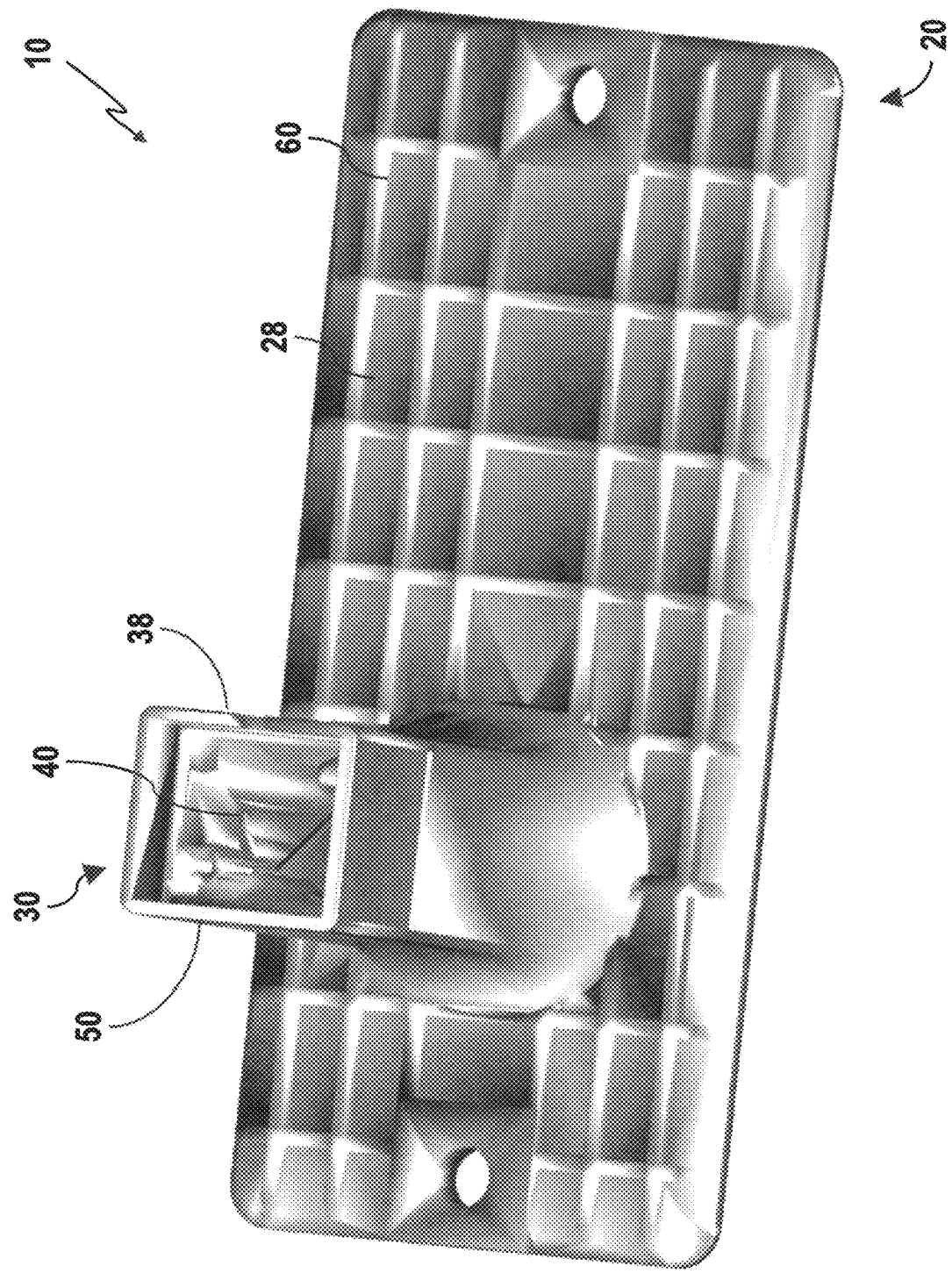
FIG. 5 is a bottom view illustration of the waveguide apparatus of FIG. 1, in accordance with the first exemplary embodiment of the present disclosure.

The face plate 20 may be a thin, substantially planar plate having a top side 22 and a bottom side 28, shown in FIG. 5. The face plate 20 may be any suitable shape for directing ultrasonic waves and for integrating with ultrasonic and optical detectors. In one example, the shape of the face plate 20 may be substantially rectangular. The face plate 20 may be made from any suitable materials for transmitting and receiving ultrasonic waves, including metal, plastic, wood, ceramic, or any combination thereof. The face plate 20 may be sized to fit with any suitable ultrasonic and optical detector. In another example, the top side 22 of the face plate 20 may include a plurality of angled surfaces 26 along the top side 22. The angled surfaces 26 may be oriented and located to improve the direction of ultrasonic waves through the waveguide apparatus 10.

The face plate 20 may include one or more mounting holes 24 located through the face plate 20. The mounting holes 24 allow the face plate 20 to be affixed to a structure or detector during use in order to secure the waveguide apparatus 10.

The ultrasonic waveguide 30 may be a substantially hollow form having an exterior wall partially surrounding a hollow interior 32. In one example, the ultrasonic waveguide 30 may be at least partially shaped as a cone or a horn. An outer edge 34 of the ultrasonic waveguide 30 may be at least partially circular or ellipsoidal, while a base 50 may be substantially square. In one example, the diameter of the hollow interior 32 may not be constant, but may be tapered along an elongate axis of the ultrasonic waveguide 30. Looking to FIG. 1, the elongate axis 34 of the ultrasonic waveguide 30 may be the axis extending in the direction between the outer edge 34 and the base 50, i.e., along the length of the ultrasonic waveguide 30 and orthogonal to the base 28 of the face plate 20.

The ultrasonic waveguide 30 may extend through a portion of the face plate 20. Depending on the shape of the face plate 20, in one example, the ultrasonic waveguide 30 may be located off-center of the face plate 20. In another example, the ultrasonic waveguide 30 may be located at the center of the face plate 20. At least a portion of the ultrasonic waveguide 30 may extend above the top side 22 of the face plate 20, while the remaining portion may extend below the top side 22. In one example, the outer edge 34 may extend above the top side 22. This is shown in greater detail in FIG. 3, below.

In manufacture, the face plate 20 and ultrasonic waveguide 30 may be a single piece. In one example, the face plate 20 and ultrasonic waveguide 30 may be fixed together by a fastening mechanism, friction fit, adhesive, epoxy, and the like. In another example, the face plate 20 and ultrasonic waveguide 30 may be manufactured as a single, monolithic piece. The monolithic piece may be formed from a uniform material, such as the materials described above. In one example, the monolithic piece may be formed from a combination of materials. For instance, the face plate 20 may be formed from a first material, and the ultrasonic waveguide 30 may be formed from a second material, which may be joined with the first material during manufacture.

Optical shield 40 extends through at least a portion of the hollow interior 32 of the ultrasonic waveguide 30. Optical shield 40 generally may be sized and shaped to minimize interference with the ultrasonic waveguide 30. In one example, the optical shield 40 may have a thin, planar shape. Optical shield 40 may be oriented so that the plane of the thin, planar shape is parallel with the elongate axis of the ultrasonic waveguide 30, i.e., the plane of optical shield 40 runs along the length of the ultrasonic waveguide 30. Optical shield 40 may be made from any suitable material or combination of materials for preventing transmission of a portion of light through the ultrasonic waveguide 30. In use, this may depend on the portion of light in which a connected optical detector is operating. For instance, light in the infrared portion of the spectrum may be blocked from transmission by certain metals, such as gold, manganese, and copper, plastics, ceramics, and the like. In one example, optical shield 40, ultrasonic waveguide 30, and faceplate 20 may be made from the same material. In another example, optical shield 40, ultrasonic waveguide 30, and faceplate 20 may be manufactured as a single, unitary, or monolithic piece. Optical shield 40 may be described in more detail in FIGS. 2 and 4, below.

Figure 2:
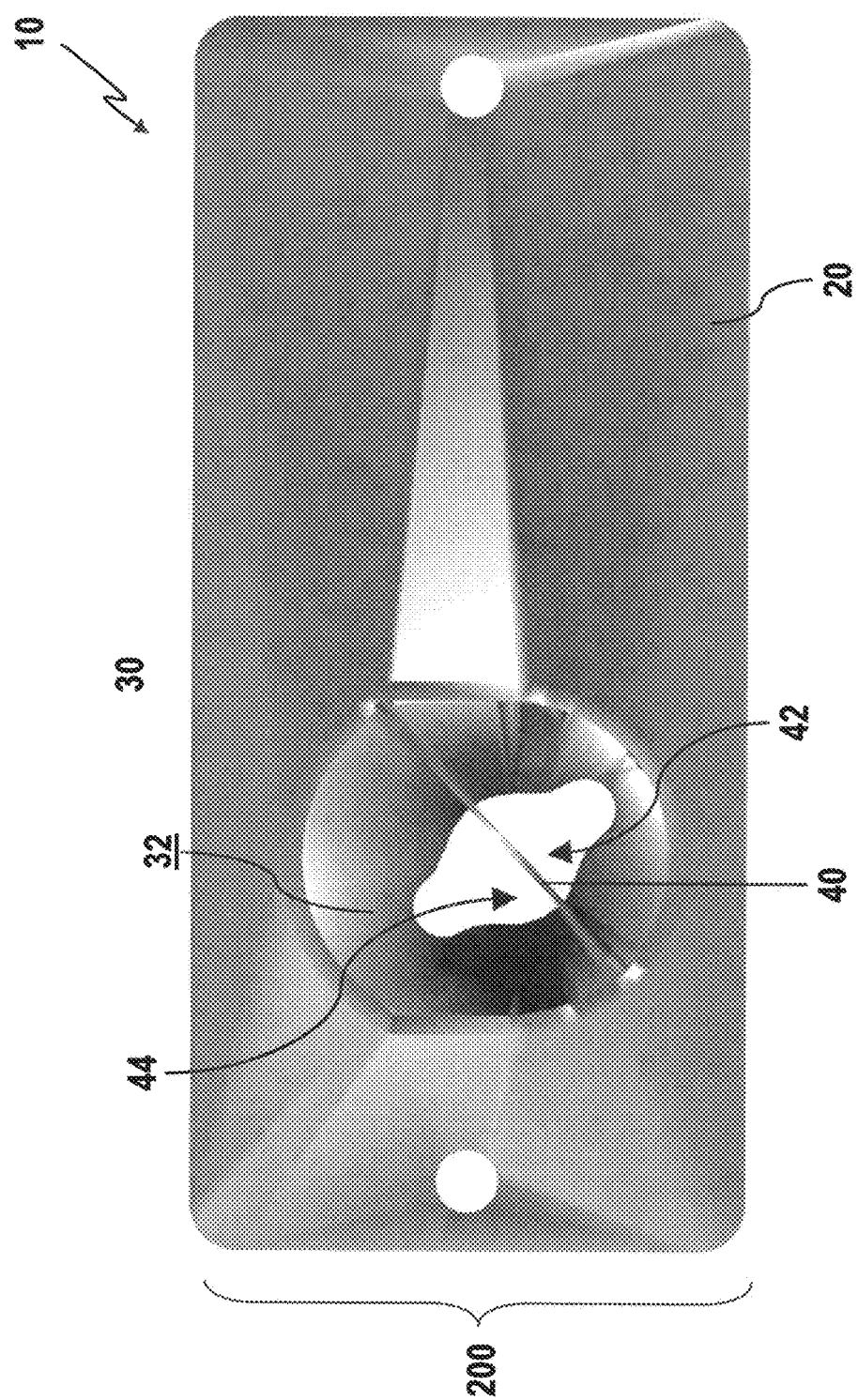
FIG. 2 is a top view illustration of the waveguide apparatus of FIG. 1, in accordance with the first exemplary embodiment of the present disclosure.

FIG. 2 is a top view illustration of the waveguide apparatus 10 of FIG. 1, in accordance with the first exemplary embodiment of the present disclosure. FIG. 2 shows the face plate 20, the ultrasonic waveguide 30 extending vertically out of the face plate 20, and the optical shield 40 located vertically within the hollow interior 32 of the ultrasonic waveguide 30. Optical shield 40 is shown oriented at an angle relative to a front face 200 of the waveguide apparatus 10. The front face 200 is shown as the vertical face at the left side of the face plate 20. This may allow optical shield 40 to be oriented between a connected light-based emitter and a connected light-based receiver in use, as shown in FIG. 6A, below. The planar surfaces of the optical shield 40—front and back faces 42, 44, respectively—may be oriented parallel to the light-based emitter and receiver to maximize the shielding effect of the optical shield 40. In one example, optical shield 40 may be oriented at an angle of about 45° relative to the front face of the waveguide apparatus 10. This may be dependent on the position and locations of the connected light-based emitter and receiver.

Figure 3:
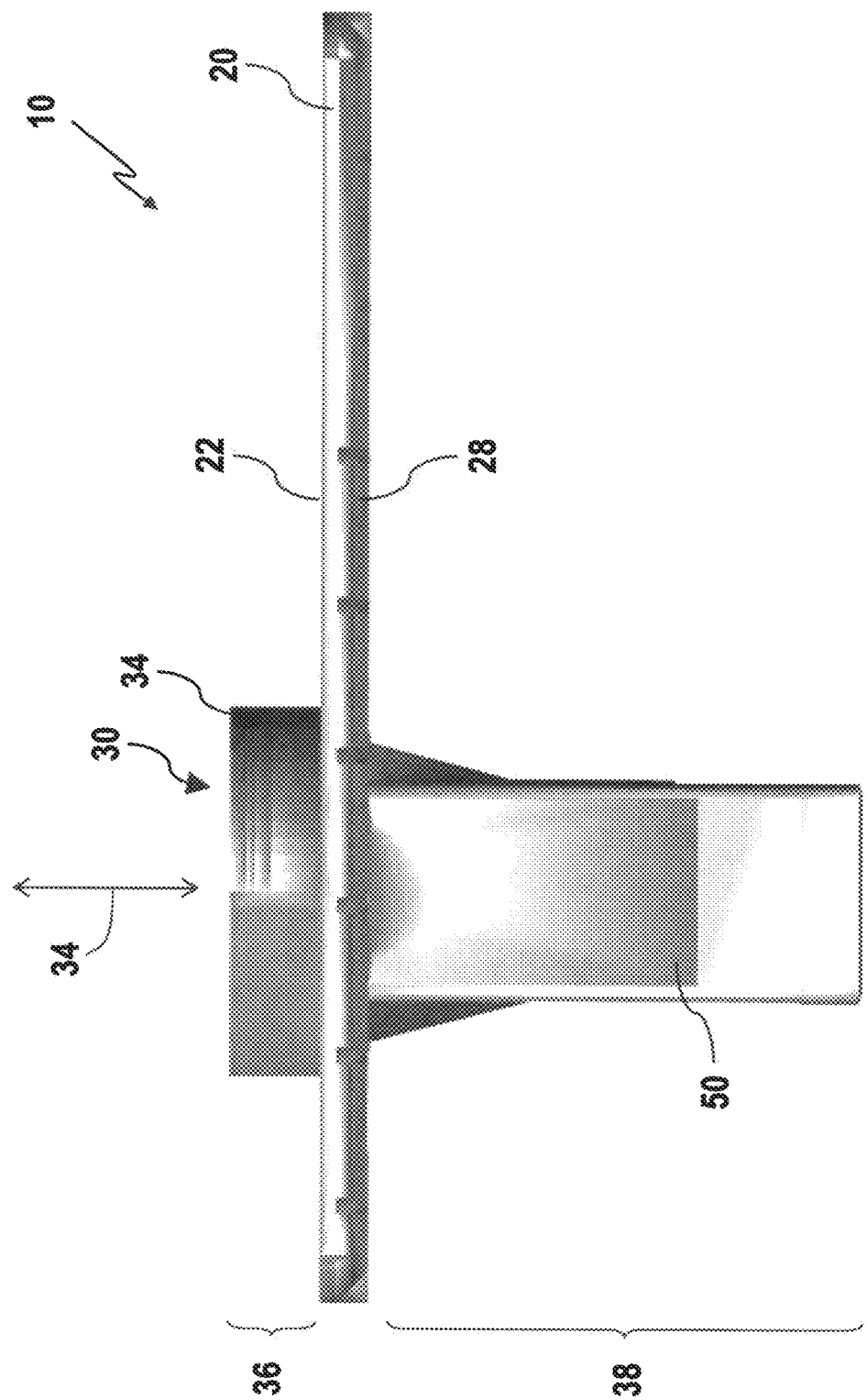
FIG. 3 is a side cross-sectional view illustration of the waveguide apparatus of FIG. 1, in accordance with the first exemplary embodiment of the present disclosure.

FIG. 3 is a side cross-sectional view illustration of the waveguide apparatus 10 of FIG. 1, in accordance with the first exemplary embodiment of the present disclosure. The planar surface of the face plate 20 is shown extending horizontally, while the ultrasonic waveguide 30 is shown extending vertically, at an orthogonal orientation to the face plate 20, through the face plate 20. A top portion 36 of the ultrasonic waveguide 30 extends above the top side 22 of the face plate 20. The top portion 36 includes the outer edge 34. A bottom portion 38 of the ultrasonic waveguide 30 extends below the top side 22 and below the bottom side 28 of the face plate 20. The bottom portion 38 may include the base 50. The base 50 may be configured to interface with an ultrasonic and light-based detector in order to allow the ultrasonic waves transmitted and received from the detector to be guided by the ultrasonic waveguide 30, as well as to prevent at least a portion of the light waves transmitted and received by the light-based detector from propagating through the ultrasonic waveguide 30.

Figure 4:
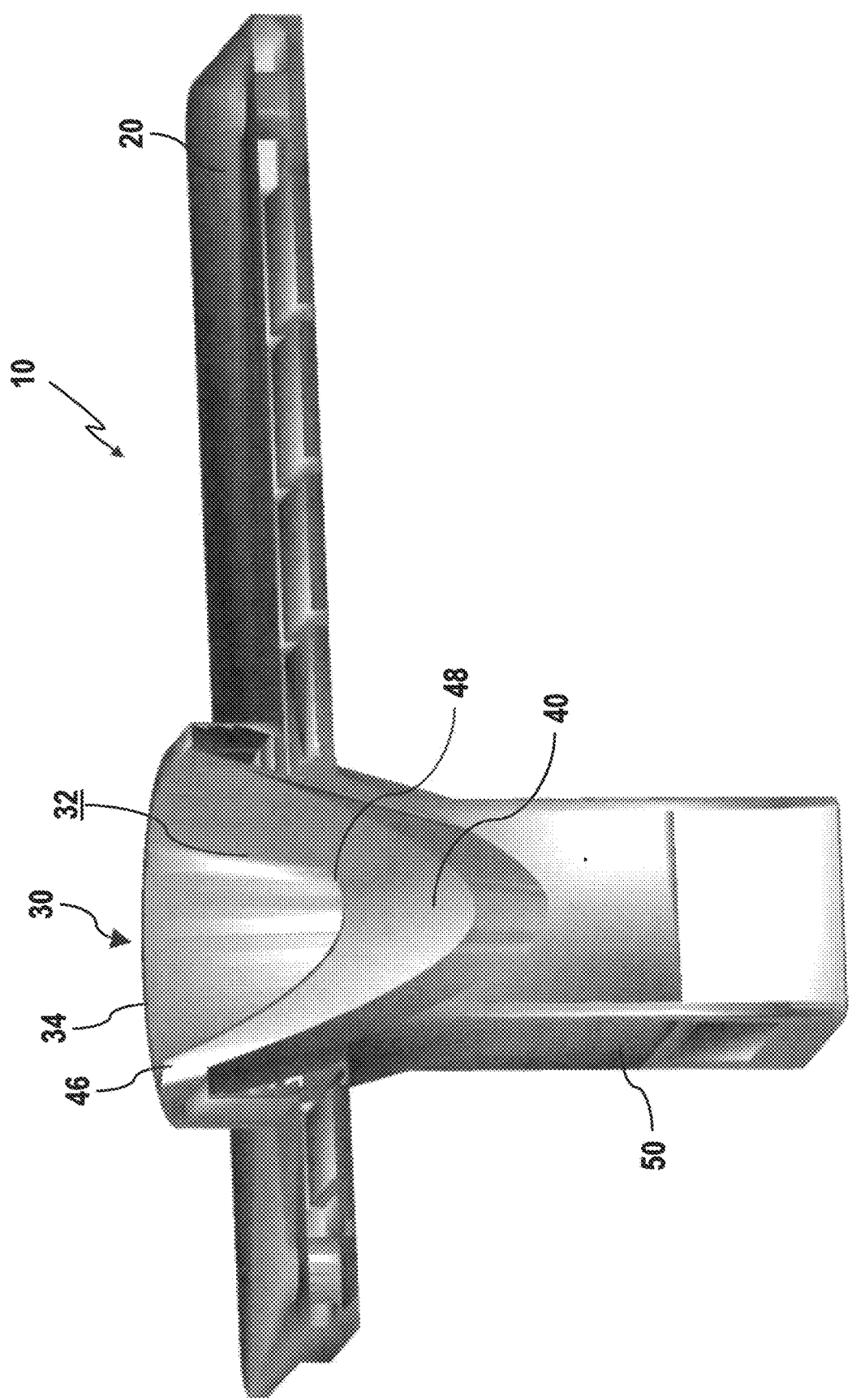
FIG. 4 is a perspective cross-section illustration of the waveguide apparatus of FIG. 1, in accordance with the first exemplary embodiment of the present disclosure.

FIG. 4 is a perspective cross-section illustration of the waveguide apparatus 10 of FIG. 1, in accordance with the first exemplary embodiment of the present disclosure. FIG. 4 shows the face plate 20, ultrasonic waveguide 30, hollow interior 32, optical shield 40, and base 50, as described in FIGS. 1-3, above. A portion of the ultrasonic waveguide 30 is not shown in order to demonstrate an exemplary shape and orientation of the optical shield 40.

As described above, optical shield 40 may be located within the hollow interior 32 of the ultrasonic waveguide 30. At least a portion of optical shield 40 may extend to the outer edge 34 of the ultrasonic waveguide 30. In one example, an outer portion 46 of the outer edge of the optical shield 40 may extend to the outer edge 34 of the ultrasonic waveguide 30 where optical shield 40 and ultrasonic waveguide 30 meet. In another example, an interior portion 48 of the outer edge of optical shield 40 may be recessed within the hollow interior 32. In one example, the recessed portion, interior portion 48, may be recessed along an arcuate line. The recessed portion 48 may allow a portion of light to propagate through the ultrasonic waveguide 30 where the interior portion 48 is recessed. This may allow the light-based sensors in use with the waveguide apparatus 10 to detect and range objects as close as the outer edge 34 of the ultrasonic waveguide 30. Without the recessed portion 48, the light-based sensors may only be able to detect and range objects at a minimum distance further away from the ultrasonic waveguide 30. The size and depth of the recessed interior portion 48 may depend on the size and location of the light-based receiver and transmitters as well as the portion of the electromagnetic spectrum being used for detection.

FIG. 5 is a bottom view illustration of the waveguide apparatus 10 of FIG. 1, in accordance with the first exemplary embodiment of the present disclosure. FIG. 5 shows the face plate 20, the ultrasonic waveguide 30 having base 50, and optical shield 40 located within the ultrasonic waveguide 30. The face plate 20 has a bottom side 28. In one example, the bottom side 28 of the face plate 20 may include a plurality of ridges 60. In one example, the plurality of ridges 60 may be arranged in a rectangular grid having orthogonal intersections. The grid of ridges 60 may improve the function of the ultrasonic waveguide 30 in directing and amplifying ultrasonic waves.

The base 50 of the ultrasonic waveguide 30 may be substantially hollow, having an open bottom portion to allow ultrasonic waves to be guided through the ultrasonic waveguide 30. In one example, optical shield 40 may not extend completely through the bottom portion 38 of the ultrasonic waveguide 30, but may only extend through a portion of the bottom portion 38.

Figure 6B:
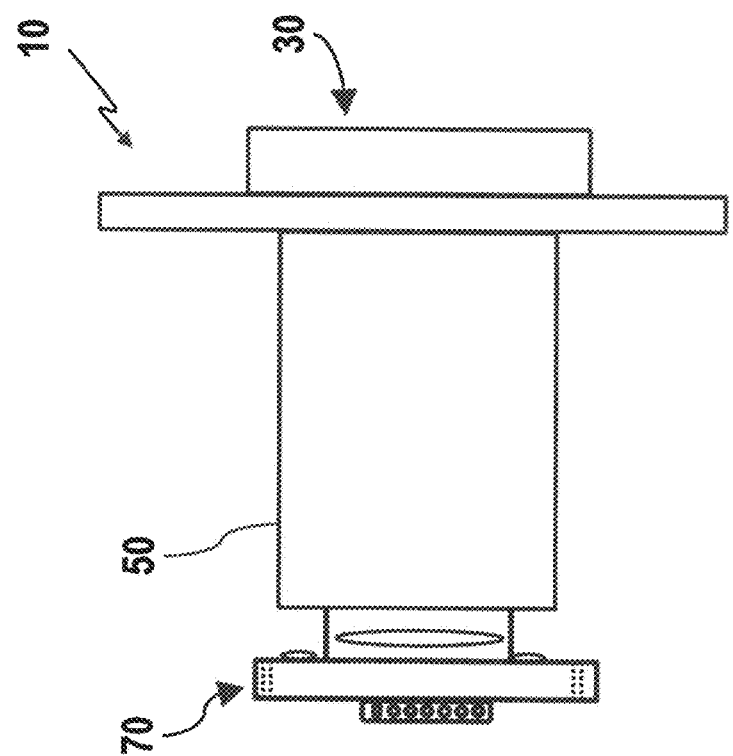
FIGS. 6A-6B are diagrammatic illustrations of the waveguide apparatus of FIG. 1 in use with an exemplary ultrasonic and light-based detector, in accordance with the first exemplary embodiment of the present disclosure.
Figure 6A:
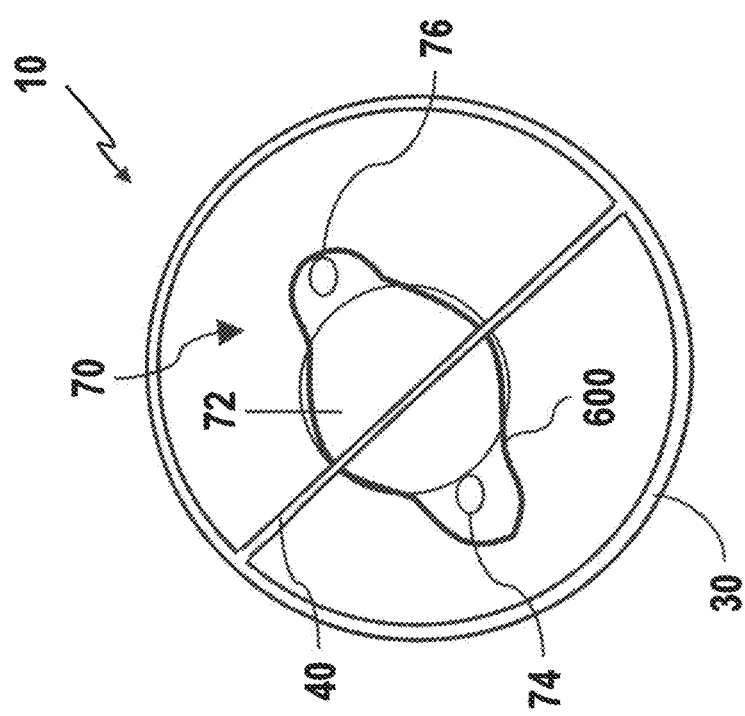

FIGS. 6A-6B are diagrammatic illustrations of the waveguide apparatus 10 of FIG. 1 in use with an exemplary ultrasonic and light-based detector 70, in accordance with the first exemplary embodiment of the present disclosure. FIGS. 6A and 6B are illustrative to show the operation of the waveguide apparatus 10 with the ultrasonic and light-based detector 70.

The ultrasonic and light-based detector ("detector") 70 may include at least one ultrasonic transducer 72, a light-based emitter 74, and a light-based receiver 76. The ultrasonic transducer 72 may emit and receive ultrasonic waves for detection and ranging of objects using an ultrasonic method. The light-based emitter 74 and light-based receiver 76 may operate using any suitable portion of the electromagnetic spectrum, for example, infrared, and may operate together to transmit a light-based signal and receive a light-based signal in return. The ultrasonic transducer 72 and the light-based emitter and receiver, 74, 76 may detect and range objects by operating individually, i.e., using ultrasonic or optical detection and ranging methods, or by operating together, i.e., using both ultrasonic and optical detection and ranging methods.

The detector 70 may be connected to the waveguide apparatus 10 at the base 50 of the waveguide apparatus 10, as shown in FIG. 6B. The ultrasonic waveguide 30 may fit over or envelope the detector 70 in order to guide the ultrasonic waves and the optical waves transmitted and received by the detector 70. As shown in FIG. 6A, an interior sidewall 600 of the ultrasonic waveguide 30 may be placed around the ultrasonic transducer 72, light-based emitter 74, and light-based receiver 76. Ultrasonic waves produced by the ultrasonic transducer 72 may travel through and be guided by the ultrasonic waveguide 30. Return ultrasonic waves may likewise be directed through the ultrasonic waveguide 30 for detection and analysis. Light waves transmitted by the light-based emitter 74 may propagate outward through the ultrasonic waveguide 30, but may not propagate through optical shield 40 to reach the light-based receiver 76. This may prevent optical crosstalk from being detected as useful data. Additionally, this may prevent the waveguide apparatus 10 from being detected—as a false positive—by the light-based receiver 76. The optical shield 40 may extend the minimum operating distance of the detector 70 to just past the face plate of the waveguide apparatus 10.

In use, the detector 70 and the waveguide apparatus 10 may be connected by any suitable means, including hardware fasteners such as screws and bolts, adhesives and epoxies, friction fit, biased members, clasps, springs, locks, or any combination thereof.

Figure 7:
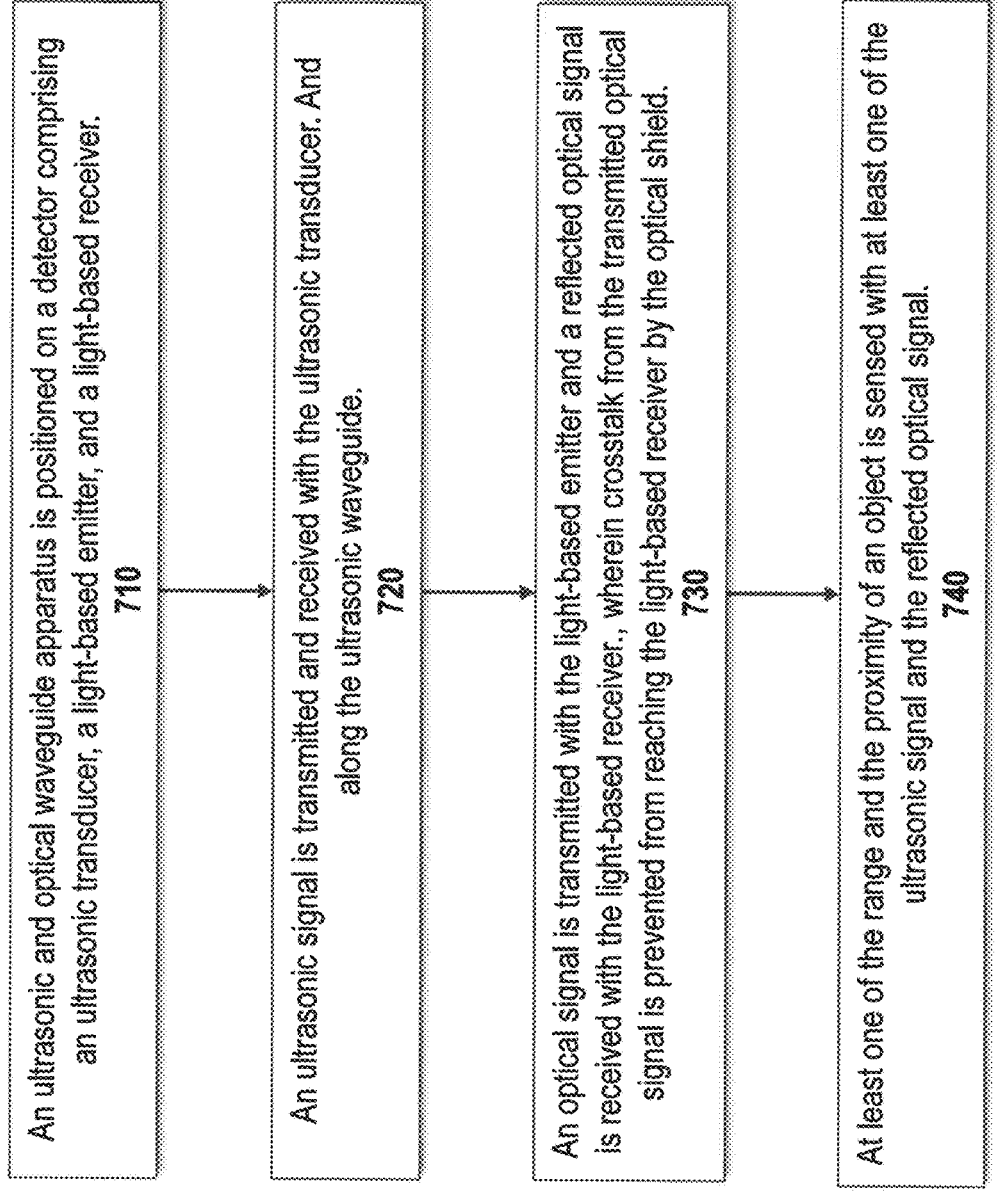
FIG. 7 is a flow chart showing a method for sensing a range and proximity of an object, in accordance with the first exemplary embodiment of the present disclosure.

FIG. 7 is a flow chart 700 showing a method for sensing a range and proximity of an object, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved. The flow chart 700 may be understood with reference to the components, materials, and processes described in FIGS. 1-6B, above.

Step 710 includes positioning, on a detector comprising an ultrasonic transducer, a light-based emitter, and a light-based receiver, an ultrasonic and optical waveguide apparatus, comprising: a face plate, an ultrasonic waveguide extending through a portion of the face plate, the ultrasonic waveguide having a hollow interior with an interior diameter tapered along an elongate axis of the ultrasonic waveguide, wherein the elongate axis of the ultrasonic waveguide is oriented orthogonal to the face plate, and an optical shield extending through at least a portion of the hollow interior of the ultrasonic waveguide, wherein the optical shield prevents transmission of a portion of light through the hollow interior. As described relative to FIGS. 6A-6B, above, transmission of the portion of light may be allowed outward from the light-based transmitter, i.e., along the elongate axis of the ultrasonic waveguide. Transmission may be prevented in a direction between the light-based transmitter and the light-based receiver.

Step 720 includes transmitting and receiving an ultrasonic signal with the ultrasonic transducer and along the ultrasonic waveguide.

Step 730 includes transmitting an optical signal with the light-based emitter and receiving a reflected optical signal with the light-based receiver, wherein crosstalk from the transmitted optical signal is prevented from reaching the light-based receiver by the optical shield.

Step 740 includes sensing at least one of a range and a proximity of an object with at least one of the ultrasonic signal and the reflected optical signal.

The method may further include any other features, components, or functions disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An ultrasonic and optical waveguide apparatus, comprising:
   a face plate;
   an ultrasonic waveguide extending through a portion of the face plate, the ultrasonic waveguide having a hollow interior with an interior diameter tapered along an elongate axis of the ultrasonic waveguide, wherein the elongate axis of the ultrasonic waveguide is oriented orthogonal to the face plate; and
   an optical shield extending through at least a portion of the hollow interior of the ultrasonic waveguide, wherein the optical shield prevents transmission of a portion of light through the hollow interior.

2. The apparatus of claim 1, wherein the optical shield has a thin, planar shape.

3. The apparatus of claim 1, wherein a face of the optical shield is oriented at an angle of 45° relative to a front face of the apparatus.

4. The apparatus of claim 1, wherein, in operation, the optical shield is oriented between a connected light-based emitter and a connected light-based receiver.

5. The apparatus of claim 1, wherein at least a portion of an outer edge of the optical shield extends to an outer edge of the ultrasonic waveguide.

6. The apparatus of claim 5, wherein a portion of the outer edge of the optical shield is located within the hollow interior of the ultrasonic waveguide.

7. The apparatus of claim 1, wherein the optical shield does not extend through a bottom portion of the hollow interior of the ultrasonic waveguide.

8. The apparatus of claim 1, wherein an outer edge of the ultrasonic waveguide extends above the face plate.

9. The apparatus of claim 1, wherein a base of the ultrasonic waveguide is substantially square.

10. The apparatus of claim 1, wherein an outer edge of the ultrasonic waveguide is at least partially ellipsoidal.

11. A method of sensing a range and proximity of an object, the method comprising the steps of:
    positioning, on a detector comprising an ultrasonic transducer, a light-based emitter, and a light-based receiver, an ultrasonic and optical waveguide apparatus, comprising:
       a face plate;
       an ultrasonic waveguide extending through a portion of the face plate, the ultrasonic waveguide having a hollow interior with an interior diameter tapered along an elongate axis of the ultrasonic waveguide, wherein the elongate axis of the ultrasonic waveguide is oriented orthogonal to the face plate; and
       an optical shield extending through at least a portion of the hollow interior of the ultrasonic waveguide, wherein the optical shield prevents transmission of a portion of light through the hollow interior,
    transmitting and receiving an ultrasonic signal with the ultrasonic transducer and along the ultrasonic waveguide;
    transmitting an optical signal with the light-based emitter and receiving a reflected optical signal with the light-based receiver, wherein crosstalk from the transmitted optical signal is prevented from reaching the light-based receiver by the optical shield; and
    sensing at least one of a range and a proximity of an object with at least one of the ultrasonic signal and the reflected optical signal.

12. The method of claim 11, wherein the optical shield has a thin, planar shape.

13. The method of claim 11, wherein a face of the optical shield is oriented at an angle of 45° relative to a front face of the apparatus.

14. The method of claim 11, wherein, in operation, the optical shield is oriented between a connected light-based emitter and a connected light-based receiver.

15. The method of claim 11, wherein at least a portion of an outer edge of the optical shield extends to an outer edge of the ultrasonic waveguide.

16. The method of claim 15, wherein a portion of the outer edge of the optical shield is located within the hollow interior of the ultrasonic waveguide.

17. The method of claim 11, wherein the optical shield does not extend through a bottom portion of the hollow interior of the ultrasonic waveguide.

18. The method of claim 11, wherein an outer edge of the ultrasonic waveguide extends above the face plate.

19. The method of claim 11, wherein a base of the ultrasonic waveguide is substantially square.

20. The method of claim 11, wherein an outer edge of the ultrasonic waveguide is at least partially ellipsoidal.

\* \* \* \* \*